United States Patent
Jung et al.

(10) Patent No.: US 11,634,801 B2
(45) Date of Patent: Apr. 25, 2023

(54) FERRITIC STAINLESS STEEL HAVING REDUCED CARBON SLUDGE ADSORPTION FOR EXHAUST SYSTEM HEAT EXCHANGER AND METHOD OF MANUFACTURING SAME

(71) Applicant: POSCO, Pohang-si (KR)

(72) Inventors: Il Chan Jung, Pohang-si (KR); Jong Chul Kim, Daegu (KR); Jae Hong Shim, Seoul (KR); Deok Chan Ahn, Seoul (KR); Jin Suk Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 559 days.

(21) Appl. No.: 16/337,629

(22) PCT Filed: Nov. 22, 2016

(86) PCT No.: PCT/KR2016/013474
§ 371 (c)(1),
(2) Date: Sep. 2, 2020

(87) PCT Pub. No.: WO2018/062617
PCT Pub. Date: Apr. 5, 2018

(65) Prior Publication Data
US 2021/0147966 A1 May 20, 2021

(30) Foreign Application Priority Data
Sep. 28, 2016 (KR) .................. 10-2016-0124670

(51) Int. Cl.
| | | |
|---|---|---|
| *C22C 38/04* | (2006.01) | |
| *C22C 38/34* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/06* | (2006.01) | |
| *C22C 38/20* | (2006.01) | |
| *C22C 38/22* | (2006.01) | |
| *C22C 38/26* | (2006.01) | |
| *C22C 38/28* | (2006.01) | |
| *F28F 21/08* | (2006.01) | |

(52) U.S. Cl.
CPC .............. *C22C 38/34* (2013.01); *C21D 6/002* (2013.01); *C21D 8/0226* (2013.01); *C21D 8/0236* (2013.01); *C21D 9/46* (2013.01); *C22C 38/001* (2013.01); *C22C 38/004* (2013.01); *C22C 38/02* (2013.01); *C22C 38/04* (2013.01); *C22C 38/06* (2013.01); *C22C 38/20* (2013.01); *C22C 38/22* (2013.01); *C22C 38/26* (2013.01); *C22C 38/28* (2013.01); *F28F 21/083* (2013.01); *C21D 2211/004* (2013.01); *C21D 2211/005* (2013.01)

(58) Field of Classification Search
CPC ..................................................... C22C 38/04
See application file for complete search history.

(56) References Cited

U.S. PATENT DOCUMENTS

2010/0272594 A1* 10/2010 Hiraide .................. C22C 38/02
420/41
2014/0069619 A1 3/2014 Hiraide et al.

FOREIGN PATENT DOCUMENTS

| | | |
|---|---|---|
| EP | 1219719 A1 | 7/2002 |
| EP | 2 224 030 A1 | 9/2010 |
| EP | 2546376 A1 | 1/2013 |
| JP | 2010-235995 A | 10/2010 |
| JP | 2016-089272 A | 5/2016 |
| KR | 10-2010-0087236 A | 8/2010 |
| KR | 10-2011-0036753 A | 4/2011 |
| KR | 10-2015-0074691 A | 7/2015 |
| KR | 10-1553607 B1 | 8/2015 |
| KR | 10-1553607 B1 | 9/2015 |
| KR | 10-2016-0079967 A | 7/2016 |

OTHER PUBLICATIONS

Japanese Office Action dated May 26, 2020 issued in Japanese Patent Application No. 2019-515616 (with English translation).
Extended European Search Report dated Aug. 5, 2019 issued in European Patent Application No. 16917818.3.
International Search Report and Written Opinion dated Jun. 14, 2017 issued in International Patent Application No. PCT/KR2016/013474 (partial English translation).
Korean Office Action dated Oct. 30, 2017 issued in Korean Patent Application No. 10-2016-0124670.
Korean Office Action dated Feb. 23, 2018 issued in Korean Patent Application No. 10-2016-0124670.
Chinese Office Action dated Aug. 18, 2020 issued in Chinese Patent Application No. 201680089674.0 (with English translation).

* cited by examiner

*Primary Examiner* — Jophy S. Koshy
(74) *Attorney, Agent, or Firm* — Morgan, Lewis & Bockius LLP

(57) ABSTRACT

Provided is a ferritic stainless steel for an exhaust system heat exchanger and a method of manufacturing the same. The ferritic stainless steel includes, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities, wherein TiN precipitates having a size of 0.1 μm or more are distributed in a surface layer of a ferrite matrix at a concentration of $2.5*10^4$ ea/mm$^2$ or less.

6 Claims, 3 Drawing Sheets

FERRITIC STAINLESS STEEL HAVING REDUCED CARBON SLUDGE ADSORPTION FOR EXHAUST SYSTEM HEAT EXCHANGER AND METHOD OF MANUFACTURING SAME

TECHNICAL FIELD

The present disclosure relates to ferritic stainless steels for exhaust system heat exchangers and a method of manufacturing the same, and more particularly, to ferritic stainless steels for exhaust system heat exchangers with reduced adsorption of carbon sludge and methods of manufacturing the ferritic stainless steels.

BACKGROUND ART

As awareness of environmental concerns has increased in recent years, exhaust gas regulations have become stricter and more stringent limits have been set on carbon dioxide emissions in the field of automobiles. In addition to development of alternative fuels, such as bioethanol and biodiesel, efforts have been made to improve the fuel efficiency by reducing weights of vehicles or installing a heat exchanger for recovery of exhaust heat or to install an exhaust gas treatment system such as an exhaust gas recirculation (EGR) system, a diesel particulate filter (DPF), and a selective catalytic reduction (SCR) system.

Here, the EGR system aims at decreasing nitrogen oxide (NOx), which is a harmful gas, by lowering combustion temperature and recirculating an exhaust gas of an engine to an intake system after cooling the exhaust gas of the engine, and by increasing heat capacity of a fuel mixer and reducing an amount of oxygen in a combustion chamber. The EGR system is essentially equipped with an EGR cooler, thereby exchanging heat between an exhaust gas and a coolant to prevent the exhaust gas from being excessively heated. Here, the EGR cooler is an apparatus for cooling the exhaust gas by an engine coolant or air, and high heat efficiency and thermal conductivity are required for a heat exchanging portion.

Generally, an EGR cooler is installed in a diesel engine, but application of the EGR cooler to a gasoline engine is being studied to achieve both improvement in fuel efficiency and reduction in nitrogen oxides.

Conventionally, austenitic stainless steels such as STS304 and STS316 are generally used for EGR coolers. On the other hand, ferritic stainless steels having a higher price competitiveness than austenitic stainless steels have been widely used in recent years because they are highly resistant to corrosion while being added with small amounts of expensive alloying elements.

Ferritic stainless steel steels are used in exhaust gas heat exchangers such as EGR coolers. However, when they are exposed to exhaust gas for a long period of time, the heat efficiency is lowered due to adsorption of carbon sludge, thereby deteriorating the function of the heat exchanger.

Accordingly, studies on developing ferritic stainless steel materials having high thermal efficiency by suppressing adsorption of carbon sludge have been actively conducted. Thus, attempts have been made to suppress adsorption of carbon sludge in ferritic stainless steels by controlling the number of precipitates in the surface layer and the ratio of each precipitate. However, there have been no meaningful research results to date.

(Patent Document 0001) Korean Laid-open Patent Publication No. 10-2011-0036753 (Apr. 4, 2011)

DISCLOSURE

Technical Problem

Therefore, it is an aspect of the present invention to provide a ferritic stainless steel for an exhaust system heat exchanger with reduced adsorption of carbon sludge which may prevent reduction in thermal efficiency of the exhaust system heat exchanger, or the like.

It is another aspect of the present invention to provide a method of manufacturing a ferritic stainless steel for an exhaust system heat exchanger with reduced adsorption of carbon sludge by controlling precipitates in a surface layer of the ferritic stainless steel.

Technical Solution

In accordance with an aspect of the present disclosure, a ferritic stainless steel for exhaust system heat exchanger with reduced adsorption of carbon sludge includes, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities, wherein TiN precipitates having a size of 0.1 μm or more are distributed in a surface layer of a ferrite matrix at a concentration of $2.5*10^4$ ea/mm$^2$ or less.

The ferritic stainless steel may further include 0.01 to 0.15% of copper (Cu).

TiN precipitates, TiN.NbC complex precipitates and NbC precipitates having a size of 0.1 μm or more respectively may be distributed in the surface layer of the ferrite matrix and the precipitates may satisfy the following Expression 1.

$$\{Z/(X+Y)\} \geq 20 \qquad \text{Expression 1}$$

Here, X is the number of TiN precipitates per unit area (ea/mm$^2$), Y is the number of TiN.NbC complex precipitates per unit area (ea/mm$^2$), and Z is the number of NbC precipitates per unit area (ea/mm$^2$).

The TiN.NbC complex precipitates may be distributed in the surface layer of the ferrite matrix at a concentration of $1.3*10^4$ ea/mm$^2$ or less.

The NbC precipitates may be distributed in the surface layer of the ferrite matrix at a concentration of $9.6*10^5$ ea/mm$^2$ or more.

In accordance with an aspect of the present disclosure, a method of manufacturing a ferritic stainless steel for exhaust system heat exchanger with reduced adsorption of carbon sludge includes: cooling a slab at an average cooling rate of 6° C./sec or more until a temperature of a surface of the slab reaches 1,100° C. during a continuous casting process, the slab made of a molten steel including, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities; re-heating and maintaining the slab at a temperature of 1,100 to 1,200° C. for 5 to 15 minutes; and water-cooling the slab to a temperature of 400° C.

Advantageous Effects

According to the embodiments of the present disclosure, thermal efficiency of a ferritic stainless steel applied to an exhaust system heat exchanger such as an EGR cooler may be improved by reducing adsorption of carbon sludge thereto by controlling components of the ferritic stainless steel and precipitates in a surface layer of the ferritic stainless steel.

Further, according to the embodiments of the present disclosure, the precipitates in the surface layer of the ferritic stainless steel may be easily controlled by controlling a manufacturing process of the ferritic stainless steel, thereby reducing adsorption of carbon sludge due to reduced sites for adsorbing hydrocarbons of the exhaust gas

DESCRIPTION OF DRAWINGS

These and/or other aspects of the disclosure will become apparent and more readily appreciated from the following description of the embodiments, taken in conjunction with the accompanying drawings of which.

BEST MODE

Figure 1:
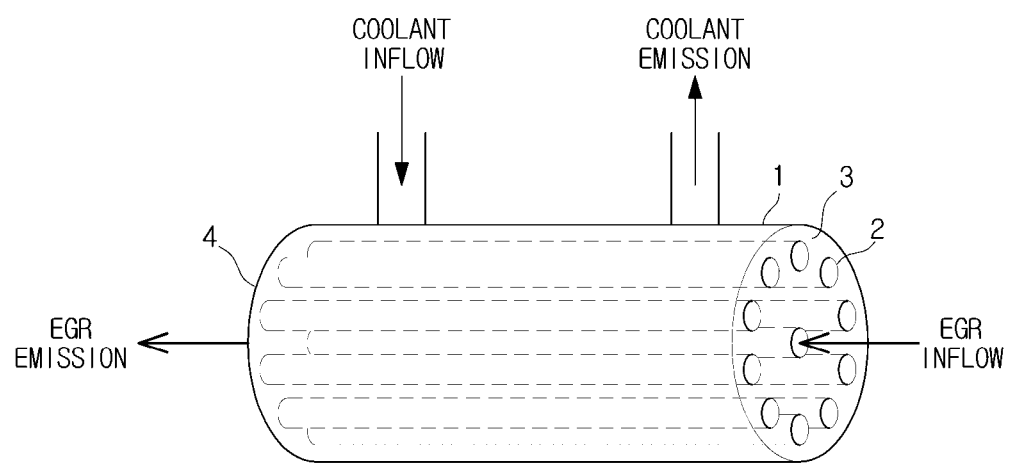
FIG. 1 is a diagram for explaining a configuration of an exhaust gas recirculation (EGR) cooler.

A ferritic stainless steel for an exhaust system heat exchanger with reduced adsorption of carbon sludge, according to an embodiment of the present disclosure, may include, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities. TiN precipitates having a size of 0.1 μm or more are distributed in a surface layer of a ferrite matrix at a concentration of $2.5*10^4$ ea/mm$^2$ or less.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a diagram for explaining a configuration of an exhaust gas recirculation (EGR) cooler.

Referring to FIG. 1, the EGR cooler includes a cylindrical case 1, a coolant inlet and a coolant outlet formed at one side of the case 1, and a plurality of cooling tubes 2 formed in a longitudinal direction of the case 1 for lowering temperature of exhaust gas passing therethrough by the coolant. That is, a temperature the exhaust gas introduced from an exhaust gas inlet 3 is adjusted to an appropriate temperature in accordance with a temperature of the coolant while the exhaust gas passes through the cooling tubes 2 and the exhaust gas is discharged through an exhaust gas outlet 4.

The inventors of the present disclosure conducted various studies to suppress adsorption of carbon sludge to ferritic stainless steels when the ferritic stainless steels are used for exhaust system heat exchangers, and the following findings were obtained.

Generally, a small amount of Ti is added to a ferritic stainless steel in order to improve corrosion resistance, so that a large amount of TiN precipitates is inevitably generated in a surface layer of a ferrite matrix. While exhaust gas containing hydrocarbons passes through the cooling tube 2, the TiN precipitates serving as catalysts provide sites for adsorption of hydrocarbons, and adsorbed hydrocarbons are superposed on each other, thereby deteriorating thermal efficiency of the heat exchanger.

In addition, a small amount of Nb is added to the ferritic stainless steel in order to further improve corrosion resistance. In the ferritic stainless steel containing Nb, TiN precipitates serve as nuclei to generate TiN.NbC complex precipitates in the surface layer. The TiN.NbC complex precipitates serving as catalysts also provide sites for adsorption of hydrocarbons and the adsorbed hydrocarbons are superposed on each other resulting in carbon sludge formation, thereby deteriorating thermal efficiency of the heat exchanger.

On the other hand, the Nb component added to the ferritic stainless steel may independently generate NbC precipitate in the surface layer of the ferrite matrix. Because the independent NbC precipitates do not serve as catalysts, there is no relation with the adsorption of hydrocarbon in the exhaust gas. Eventually, the NbC precipitates may suppress the adsorption of the carbon sludge to the exhaust system heat exchanger.

Therefore, when a ferritic stainless steel material to which small amounts of Ti and Nb are added is used in an exhaust system heat exchanger, it is possible to reduce the adsorption of carbon sludge by suppressing the formation of the TiN precipitates and the TiN.NbC complex precipitates generated by using the TiN precipitates as nuclei and by increasing the number of independent NbC precipitates.

Hereinafter, components and surface precipitates of a ferritic stainless steel for an exhaust system heat exchanger with reduced adsorption of carbon sludge according to an embodiment of the present disclosure will be described in detail.

A ferritic stainless steel for an exhaust system heat exchanger with reduced adsorption of carbon sludge according to an embodiment of the present disclosure may include, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities.

C: 0.003% to 0.1%

Carbon is an element that greatly affects strength of steels. When the C content is excessive, strength of a steel is excessively increased to deteriorate ductility, and thus the C content is limited to 0.1% or less. However, when the C content is too low, the strength is excessively lowered, so that a lower limit may be 0.005%.

Si: 0.01% to 2.0%

Silicon is an element added for deoxidation of a molten steel during steelmaking and stabilization of ferrite. In the present disclosure, 0.01% or more of Si is added. However, when the content is excessive, the material is hardened and ductility of the steel is lowered, and thus the Si content is limited to 2.0% or less.

Mn: 0.01% to 1.5%

Manganese is an element effective for improving corrosion resistance. In the present disclosure, 0.01% or more is added, and more preferably 0.5% or more is added. However, when the Mn content is excessive, generation of Mn fumes will rapidly increase to deteriorate weldability and ductility of the steel is deteriorated due to formation of excessive MnS precipitates. The Mn content is limited to 1.5% or less, more preferably 1.0% or less.

P: 0.05% or Less

Phosphorus is an impurity that is inevitably contained in steels causing intergranular corrosion at the time of pickling or deteriorating hot workability. Therefore, the P content may be as low as possible. In the present disclosure, an upper limit of the P content is controlled to 0.05%.

S: 0.005% or Less

Since sulfur is an impurity inevitably contained in the steel segregated in grain boundaries and mainly hindering hot workability. Therefore, the S content may be as low as possible. In the present disclosure, an upper limit of the S content is controlled to 0.005%.

Cr: 10% to 30%

Chromium is an element effective for improving corrosion resistance of steels. In the present disclosure, Cr is added by 10% or more. However, when the Cr content is excessive, not only manufacturing costs increase but also grain boundary corrosion occurs, so that the Cr content is limited to 30% or less.

Ti: 0.001% to 0.1%

Titanium fixes carbon and nitrogen to reduce amounts of solid carbon and solid nitrogen in steels and is effective in improving corrosion resistance of the steels. However, TiN precipitates formed in the surface layer serve as catalysts and act as important sites for adsorption of hydrocarbons of the exhaust gas, e.g., adsorption of carbon sludge. Therefore, the Ti content is limited to 0.1% or less, more preferably 0.05% or less. However, the Ti component may exist in the molten steel as an inevitable impurity, and the manufacturing costs increase to completely remove Ti, and thus 0.001% or more is allowed.

Al: 0.001% to 0.15%

Aluminum is a powerful deoxidizer, which serves to lower the content of oxygen in a molten steel, and is added in an amount of 0.001% or more in the present disclosure. However, when the Al content is excessive, the sleeve defect of the cold-rolled strip occurs due to the increase of non-metallic inclusions and weldability deteriorates. The Al content is limited to 0.15% or less, more preferably 0.1% or less.

N: 0.003% to 0.03%

Nitrogen is an element that accelerates recrystallization by precipitation of austenite during hot rolling. In the present disclosure, 0.003% or more of nitrogen is added. However, when the content is excessive, ductility of the steel is deteriorated, and the N content is limited to 0.03% or less.

Nb: 0.3% to 0.6%

Niobium is combined with dissolved C to precipitate NbC to lower the dissolved C content and increase corrosion resistance. NbC in the surface layer plays a role of suppressing the adsorption of the carbon sludge to the heat exchanger since NbC does not interact with hydrocarbons contained in the exhaust gas. Therefore, in the present disclosure, the Nb content may be 0.3% or more. However, when the Nb content is excessive, the recrystallization is inhibited and the formability is lowered, the Nb content may be 0.6% or less.

Mo: 0.01% to 2.5%

Molybdenum plays a role of increasing corrosion resistance of ferritic stainless steels and improving high temperature strength. Therefore, the Mo content may be 0.01% or more. However, when the content is excessive, brittleness occurs due to generation of intermetallic precipitates. Therefore, the Mo content may be 2.5% or less.

A ferritic stainless steel for an exhaust system heat exchanger with reduced adsorption of carbon sludge according to an embodiment of the present disclosure may further contain 0.01 to 0.15% of Cu.

Cu: 0.01% to 0.15%

Copper has the effect of increasing corrosion resistance in an exhaust system condensate environment. Therefore, the Cu content may be 0.01% or more. However, when the content is excessive, ductility is lowered and quality of a molded product is lowered. Therefore, the Cu content may be 0.15% or less.

Figure 2:
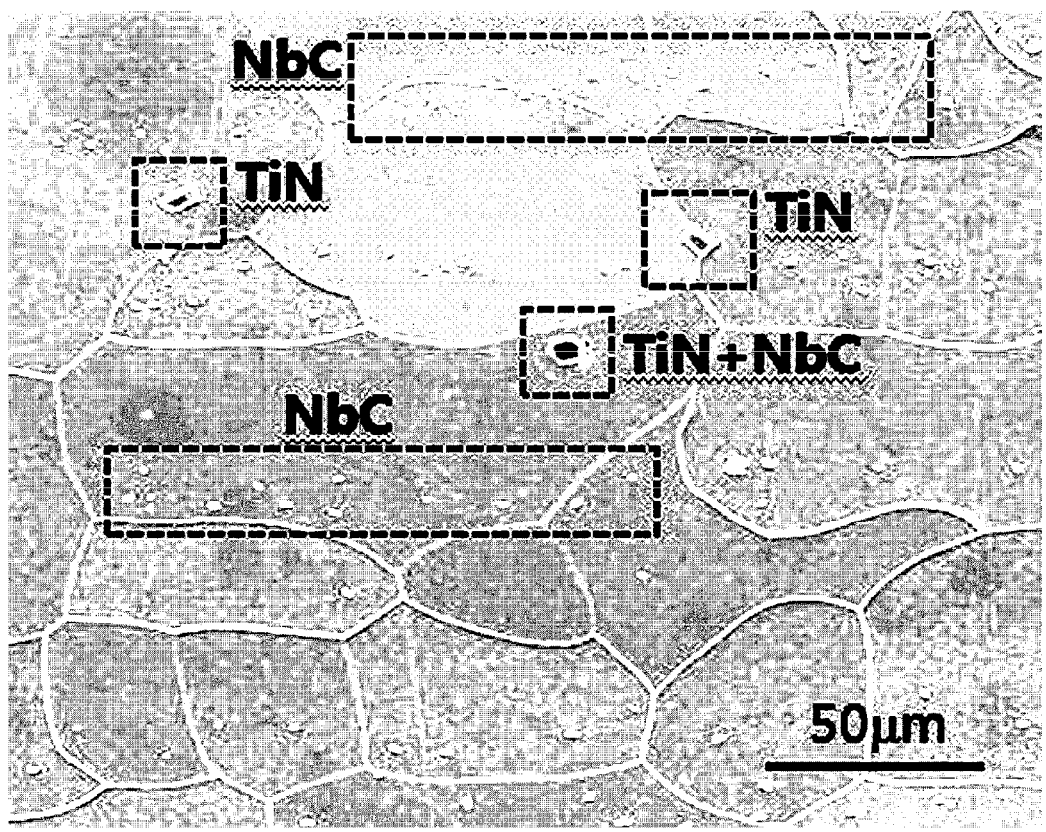
FIG. 2 is a scanning electron microscope (SEM) image of a microstructure of a 0.4 mm-thick cold-rolled annealed sheet according to an embodiment of the present disclosure.

FIG. 2 is a scanning electron microscope (SEM) image of a microstructure of a 0.4 mm-thick cold-rolled annealed sheet according to an embodiment of the present disclosure.

Referring to FIG. 2, TiN precipitates, TiN.NbC complex precipitates, and NbC precipitates may be visually confirmed by a scanning electron microscope (SEM) observation of the surface layer of the 0.4 mm-thick sheet.

Referring to FIG. 2, the ferritic stainless steel for an exhaust system heat exchanger having reduced carbon sludge adsorption according to an embodiment of the present disclosure includes TiN precipitates having a size of 0.1 m or more in the surface layer of the ferrite matrix at a concentration of $2.5*10^4$ ea/mm$^2$ or less. Preferably, the TiN precipitates are distributed at a concentration of $2.3*10^4$ ea/mm$^2$ or less.

As described above, the TiN precipitate act as important sites for the adsorption of hydrocarbons, e.g., carbon sludge, of the exhaust gas due to the catalytic action. Therefore, it is necessary to control the distribution of the TiN precipitates.

When TiN precipitates having a size of 0.1 μm or more are distributed in the surface layer of the ferrite matrix at a concentration of more than $2.5*10^4$ ea/mm$^2$, the effect of reducing the adsorption amount of carbon sludge by 50% or more compared to existing ferritic stainless steels cannot be obtained.

In the ferritic stainless steel for an exhaust system heat exchanger with reduced adsorption of carbon sludge according to an embodiment of the present disclosure, TiN precipitates, TiN.NbC complex precipitates, and NbC precipitates having a size of 0.1 μm or more respectively are distributed in the surface layer of the ferrite matrix, and the precipitates may satisfy the following Expression 1.

$$\{Z/(X+Y)\} \geq 20 \qquad \text{Expression 1}$$

Here, X is the number of TiN precipitates per unit area (ea/mm$^2$), Y is the number of TiN.NbC complex precipitates per unit area (ea/mm$^2$), and Z is the number of NbC precipitates per unit area (ea/mm$^2$).

In Nb-added ferritic stainless steels, TiN.NbC complex precipitates are formed in the surface layer using TiN precipitates as nuclei, which may also be sites for adsorbing hydrocarbons because TiN precipitates serve as catalysts. Therefore, it is necessary to control not only the TiN precipitates but also the distribution of the TiN.NbC complex precipitates.

The adsorption of the carbon sludge may be reduced by controlling the distribution of each of the precipitates through the above-mentioned Expression 1 related to the distribution of the TiN precipitates, the TiN.NbC complex precipitates, and the NbC precipitates. When a value according to Expression 1 above is less than 20, the distribution of TiN precipitates and TiN.NbC complex precipitates is relatively larger than that of NbC precipitates, and there are many sites to which hydrocarbons may be adsorbed. Compared with conventional ferritic stainless steels, the sludge adsorption amount cannot be sufficiently reduced.

In the ferritic stainless steel for an exhaust system heat exchanger with reduced adsorption of carbon sludge according to an embodiment of the present disclosure, TiN.NbC complex precipitates having a size of 0.1 μm or more are distributed in the surface layer of the ferrite matrix at a concentration of 2.0*10$^4$ ea/mm$^2$ or less.

When the TiN.NbC complex precipitates having a size of 0.1 μm or more are distributed in the surface layer of the ferrite matrix at a concentration of more than 2.0*10$^4$ ea/mm$^2$, the effect of reducing the adsorption amount of carbon sludge by 50% or more compared to the existing ferritic stainless steel cannot be obtained.

In a ferritic stainless steel for an exhaust system heat exchanger with reduced adsorption of carbon sludge according to an embodiment of the present disclosure, the NbC precipitates having a size of 0.1 μm or more are distributed in the surface layer of the ferrite matrix at a concentration of 8.5*10$^5$ ea/mm$^2$ or more.

When the NbC precipitates having a size of 0.1 μm or more are distributed in the surface layer of the ferrite matrix at a concentration of less than 8.5*10$^5$ ea/mm$^2$, the effect of reducing the adsorption amount of carbon sludge by 50% or more compared to the existing ferritic stainless steel cannot be obtained.

In addition, the distribution and size of the TiN precipitates, the TiN.NbC complex precipitates, and the NbC precipitates may be obtained by controlling cooling conditions in the continuous casting of the ferrite-based stainless steel slab to be described later. This cannot be achieved according to conventional cooling conditions.

A method of manufacturing a ferritic stainless steel for an exhaust system heat exchanger with reduced adsorption of carbon sludge includes: cooling a slab at an average cooling rate of 6° C./sec or more until the temperature of the slab surface reaches 1,100° C. during a continuous casting process, the slab made of a molten steel including, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.001 to 0.10% of titanium (Ti), 0.001 to 0.15% of aluminum (Al), 0.003 to 0.03% of nitrogen (N), 0.3 to 0.6% of niobium (Nb), 0.01 to 2.5% of molybdenum (Mo), and the remainder of iron (Fe) and other inevitable impurities; re-heating and maintaining the slab at a temperature of 1,100 to 1,200° C. for 5 to 15 minutes; and water-cooling the slab to a temperature of 400° C.

The content and the role of the components of the ferritic stainless steel are the same as those described above, and a duplicate description will be omitted.

That is, the slab may be manufactured through continuous casting using molten steel having the above-mentioned components, and a final product may be manufactured according to a general ferritic stainless steel manufacturing process such as hot rolling, hot rolling annealing, cold rolling and annealing.

Here, a cooling pattern may be controlled during continuous casting of the slab. The distribution and size of the TiN precipitates, the TiN.NbC complex precipitates, and the NbC precipitates may be controlled by controlling the cooling pattern.

Figure 3:
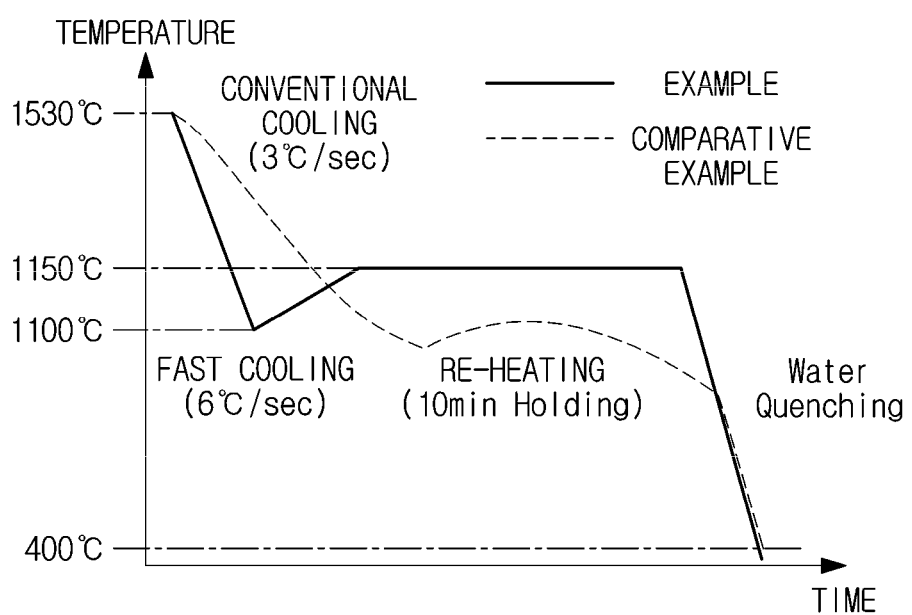
FIG. 3 is a graph for explaining a cooling pattern in continuous casting of a ferritic stainless steel according to an embodiment of the present disclosure.

FIG. 3 is a graph for explaining a cooling pattern in continuous casting of a ferritic stainless steel according to an embodiment of the present disclosure.

Referring to FIG. 3, the method according to an embodiment of the present disclosure is characterized in cooling the slab at an average cooling rate of 6° C./sec or more until the temperature of the surface of the slab reaches 1,100° C. during continuous casting of the slab. At this time, a precipitation nose temperature of the TiN precipitates is about 1,400° C. Precipitation of TiN may be minimized by avoiding a temperature range of about 1,400° C. by cooling the slab at a high rate from 1,530° C. to 1,100° C. based on the surface temperature of the slab after initiation of solidification of the slab.

For example, the temperature of the surface of the slab may be reduced to 1,100° C. from 1,530° C. within 90 seconds, preferably within 80 seconds.

The cooled slab is then re-heated and maintained at a temperature of 1,100 to 1,200° C. for 5 to 15 minutes. At this time, since a precipitation nose temperature of the NbC precipitates is about 1,150° C., it is possible to maximize precipitation of the NbC alone on the surface of the slab by re-heating the slab at a temperature range of about 1,150° C.

The re-heated slab is cooled to 400° C. by water quenching. The slab is rapidly quenched to suppress formation of other precipitates such as laves-phases and sigma-phases.

Therefore, it is possible to control the size, distribution and correlation of the TiN precipitates, the TiN.NbC complex precipitates, the NbC precipitates through the cooling pattern of controlling the surface temperature of the slab during continuous casting of the ferritic stainless steel.

Hereinafter, a ferritic stainless steel for an exhaust system heat exchanger with reduced adsorption of carbon sludge according to an embodiment of the present disclosure will be described in detail with examples and comparative examples to embodiments.

EXAMPLES

Molten steels having the compositions shown in Table 1 below were prepared and slabs were produced through continuous casting.

TABLE 1

| Weight % | C | N | Si | Mn | P | S | Cr | Ti | Al | Nb | Mo |
| --- | --- | --- | --- | --- | --- | --- | --- | --- | --- | --- | --- |
| Inventive Steel 1 | 0.008 | 0.01 | 0.29 | 0.85 | 0.028 | 0.004 | 18.4 | 0.09 | 0.11 | 0.51 | 1.9 |
| Inventive Steel 2 | 0.009 | 0.008 | 0.31 | 0.84 | 0.032 | 0.003 | 18.7 | 0.02 | 0.01 | 0.54 | 2 |
| Comparative Steel 1 | 0.011 | 0.009 | 0.25 | 0.87 | 0.031 | 0.003 | 18.5 | 0.15 | 0.12 | 0.53 | 2.1 |

At here, the cooling pattern of the slabs in continuous casting was carried out according to FIG. 3.

That is, when manufacturing the slabs according to the inventive steels and the comparative steel through the cooling pattern according to an embodiment of the present disclosure, the inventive steels 1 and 2 and comparative steel 1 were rapidly cooled at a speed of 6° C./sec respectively such that a surface temperature of each steel decreased from 1,530° C. to 1,100° C., re-heated and maintained at 1,150° C. for 10 minutes, and then cooled down to 400° C. through the water quenching according to Examples 1 and 2 and Comparative Example 4.

According to Comparative Examples 1 to 3, the slabs were manufactured through a conventional normal cooling pattern.

The manufactured slabs were crafted into 0.4 mm-thick cold-rolled plates through hot-rolling, hot-rolled annealing, cold-rolling, and cold-rolled annealing.

Thereafter, images of surface layers of the cold-rolled annealed sheets were obtained by using a transmission electron microscope (TEM). The number and ratio (P) of TiN precipitates, TiN.NbC complex precipitates, and NbC precipitates having a size of 0.1 μm or more respectively were measured by an image analyzer and are shown in Table 2 below.

TABLE 2

| | Steel | Number of TiN precipitates (ea/mm$^2$) | Number of TiN•NbC complex precipitates (ea/mm$^2$) | Number of NbC precipitates (ea/mm$^2$) | Expression 1 |
|---|---|---|---|---|---|
| Example 1 | Inventive Steel 1 | $2.3*10^4$ | $1.3*10^4$ | $9.6*10^4$ | 26.7 |
| Example 2 | Inventive Steel 2 | $1.8*10^4$ | $1.1*10^4$ | $9.7*10^4$ | 33.4 |
| Comparative Example 1 | Inventive Steel 1 | $4.7*10^4$ | $2.1*10^4$ | $7.9*10^4$ | 11.6 |
| Comparative Example 2 | Inventive Steel 2 | $2.8*10^4$ | $1.2*10^4$ | $7.7*10^4$ | 19.3 |
| Comparative Example 3 | Comparative Steel 1 | $7.2*10^4$ | $3.2*10^4$ | $7.2*10^4$ | 6.9 |
| Comparative Example 4 | Comparative Steel 1 | $5.5*10^4$ | $2.4*10^4$ | $8.4*10^4$ | 10.6 |

Referring to the above Table 2, the inventive steels 1 and 2 include TiN precipitates at a concentration of $4.7 \times 10^4$ ea/mm$^2$ or less and TiN.NbC complex precipitates at a concentration of $2.1 \times 10^4$ ea/mm$^2$ or less. That is, it can be seen that the inventive steels 1 and 2 have lower amounts of TiN precipitates and TiN.NbC complex precipitates than that of the comparative steels 1. In the case of comparative steel 1, it was found that the content of C and Ti deviated from the composition ratio of the present disclosure, and that the TiN precipitates were distributed at a concentration of $5.5*10^4$ ea/mm$^2$ or more and the TiN.NbC complex precipitates were distributed at a concentration of $2.4*10^4$ ea/mm$^2$.

Although the composition ratios according to the embodiments of the present disclosure are satisfied, it is difficult to satisfy desired distribution of the precipitates according to the present disclosure when the slabs are cooled according to a conventional cooling pattern, which is out of the embodiment of the present disclosure, during the continuous casting of the slab.

That is, in Example 1 and Comparative Example 1, slabs were produced by using the same inventive steel 1 but according to different cooling patterns of the cooling pattern in FIG. 3 and the conventional cooling pattern, respectively, and then cold-rolled annealed sheets were produced thereafter.

Referring to Example 1 and Comparative Example 1, it can be seen that when the slabs are produced according to different cooling patterns during continuous casting of the inventive steel 1 of the same component system, different precipitates are formed on the surface of the final cold-rolled material. That is, it was found that the value obtained according to Expression 1 above about the correlation between the TiN precipitates, the TiN.NbC complex precipitates and the NbC precipitates was 20 or more according to Example 1 in which the slab was produced in accordance with the cooling pattern of the present disclosure.

In Example 2 and Comparative Example 2, slabs were produced by using the same inventive steel 2 but according to different cooling pattern of the cooling pattern shown in FIG. 3 and the conventional cooling pattern, respectively, and then cold-rolled annealed sheets were produced thereafter. In the same manner as in Example 1 and Comparative Example 1, it was found that the value obtained according to Expression 1 above about the correlation between the TiN precipitates, the TiN.NbC complex precipitates and the NbC precipitates was 20 or more according to Example 2 in which the slab was produced in accordance with the cooling pattern of the present disclosure.

In addition, the cold-rolled annealed sheets were manufactured to have a thickness of 1.2 mm as well as a thickness of 0.4 mm, and exhaust gas heat exchanger simulators were manufactured using the same as shown in FIG. 1. Then, amounts of carbon sludge adsorbed thereto were quantified by measuring the weight changes of the heat exchanger simulators after flowing gasoline exhaust gas at the same flow rate for 96 hours, and the results are shown in Table 3 below.

TABLE 3

| | Steel | Amount of carbon sludge adsorption (g) |
|---|---|---|
| Example 1 | Inventive Steel 1 | 7 |
| Example 2 | Inventive Steel 2 | 5 |
| Comparative Example 1 | Inventive Steel 1 | 12 |
| Comparative Example 2 | Inventive Steel 2 | 10.5 |
| Comparative Example 3 | Comparative Steel 1 | 15 |
| Comparative Example 4 | Comparative Steel 1 | 13 |

Referring to Table 2 and Table 3, in the ferritic stainless steels produced according to the composition ratios and the slab cooling patterns according to the embodiments of the present disclosure, TiN precipitates having a size of 0.1 μm or more are distributed at a concentration of $2.5*10^4$ ea/mm$^2$ or less. In the experiment using the exhaust gas heat exchanger simulator, the adsorption amount of the carbon sludge was reduced by 50% or more as compared with the comparative examples for the same steel type.

In contrast, in the case of Comparative Examples 3 and 4, it is difficult to control the precipitates, and it is difficult to sufficiently reduce the amount of adsorbed carbon sludge, although the slabs are produced according to the cooling pattern of the present disclosure.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The ferrite stainless steel with reduced adsorption of carbon sludge and the method of manufacturing the same according to the embodiments of the present disclosure can be applied to an exhaust system heat exchanger such as an EGR cooler.

The invention claimed is:

1. A ferritic stainless steel for an exhaust system heat exchanger, the ferritic stainless steel comprising, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.02 to 0.10% of titanium (Ti), 0.001 to 0.15% of aluminum (Al), 0.008 to 0.03% of nitrogen (N), 0.3 to 0.6% of niobium (Nb), 0.01 to 2.5% of molybdenum (Mo), and the remainder of iron (Fe) and other inevitable impurities, wherein:
TiN precipitates having a size of 0.1 μm or more are distributed in a surface layer of a ferrite matrix at a concentration of $2.5*10^4$ ea/mm² or less and TiN precipitates, TiN·NbC complex precipitates, and NbC precipitates having a size of 0.1 μm or more respectively are distributed in the surface layer of the ferrite matrix and satisfy Expression 1:

$$\{Z/(X+Y)\} \geq 20 \qquad \text{Expression 1}$$

where X is the number of the TiN precipitates per unit area, ea/mm², Y is the number of the TiN·NbC complex precipitates per unit area, ea/mm², and Z is the number of the NbC precipitates per unit area, ea/mm².

2. The ferritic stainless steel of claim 1, further comprising, in percent (%) by weight of the entire composition, 0.01 to 0.15% of copper (Cu).

3. The ferritic stainless steel of claim 1, comprising, in percent (%) by weight of the entire composition, 0.09 to 0.10% of titanium (Ti) and 0.008 to 0.010% of nitrogen (N).

4. The ferritic stainless steel of claim 1, wherein the TiN·NbC complex precipitates are distributed in the surface layer of the ferrite matrix at a concentration of $1.3*10^4$ ea/mm² or less.

5. The ferritic stainless steel of claim 1, wherein the NbC precipitates are distributed in the surface layer of the ferrite matrix at a concentration of $9.6*10^5$ ea/mm² or more.

6. A method of manufacturing the ferritic stainless steel of claim 1, the method comprising:
cooling a slab at an average cooling rate of 6° C./sec or more until a temperature of a surface of the slab reaches 1,100° C. during a continuous casting process, the slab made of a molten steel comprising, in percent (%) by weight of the entire composition, 0.003 to 0.1% of carbon (C), 0.01 to 2.0% of silicon (Si), 0.01 to 1.5% of manganese (Mn), 0.05% or less of phosphorus (P), 0.005% or less of sulfur (S), 10 to 30% of chromium (Cr), 0.02 to 0.10% of titanium (Ti), 0.001 to 0.15% of aluminum (Al), 0.008 to 0.03% of nitrogen (N), 0.3 to 0.6% of niobium (Nb), 0.01 to 2.5% of molybdenum (Mo), and the remainder of iron (Fe) and other inevitable impurities;
re-heating and maintaining the slab at a temperature of 1,100 to 1,200° C. for 5 to 15 minutes; and
water-cooling the slab to a temperature of 400° C.

* * * * *